(12) United States Patent
Nicolas

(10) Patent No.: US 8,989,272 B2
(45) Date of Patent: *Mar. 24, 2015

(54) METHOD AND DEVICE FOR IMAGE INTERPOLATION SYSTEMS BASED ON MOTION ESTIMATION AND COMPENSATION

(71) Applicant: STMicroelectronics SA, Montrouge (FR)

(72) Inventor: Marina Nicolas, Voreppe (FR)

(73) Assignee: STMicroelectronics SA, Montrouge (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/154,057

(22) Filed: Jan. 13, 2014

(65) Prior Publication Data

US 2014/0126647 A1      May 8, 2014

Related U.S. Application Data

(60) Continuation of application No. 13/206,315, filed on Aug. 9, 2011, now Pat. No. 8,630,338, which is a division of application No. 11/136,293, filed on May 24, 2005, now Pat. No. 8,000,386.

(30) Foreign Application Priority Data

May 25, 2004   (FR) ..................... 04 05634

(51) Int. Cl.
| | |
|---|---|
| H04N 7/12 | (2006.01) |
| H04N 11/02 | (2006.01) |
| H04N 11/04 | (2006.01) |
| H04N 5/14 | (2006.01) |
| H04N 19/51 | (2014.01) |
| H04N 19/513 | (2014.01) |
| H04N 19/56 | (2014.01) |
| H04N 7/01 | (2006.01) |

(52) U.S. Cl.
CPC ......... *H04N 19/00703* (2013.01); *H04N 5/145* (2013.01); *H04N 7/014* (2013.01); *H04N 19/51* (2014.01); *H04N 19/521* (2014.01); *H04N 19/56* (2014.01)
USPC .................................................. 375/240.16

(58) Field of Classification Search
CPC .................. H04N 19/00587; H04N 19/00703; H04N 5/145
USPC ........................................ 375/240.16, 240.24
See application file for complete search history.

(56) References Cited

U.S. PATENT DOCUMENTS

| 5,072,293 A | 12/1991 | De Haan et al. ............... 348/699 |
| 5,148,269 A | 9/1992 | de Haan et al. ............... 348/699 |

(Continued)

FOREIGN PATENT DOCUMENTS

| WO | WO 99/40726 | 8/1999 |
| WO | WO 02/087210 | 10/2002 |

OTHER PUBLICATIONS

French Preliminary Search Report dated Oct. 20, 2004 for French Application No. 04 05634.

*Primary Examiner* — Nhon Diep
(74) *Attorney, Agent, or Firm* — Gardere Wynne Sewell LLP

(57) ABSTRACT

A motion estimation method and device are provided for processing images to be inserted, between a preceding original image and a following original image, into a sequence of images. Each image is divided into pixel blocks associated with motion vectors. For a current block of an image being processed, motion vectors associated with blocks of the image being processed and/or associated with blocks of a processed image are selected. Candidate vectors are generated from selected motion vectors. An error is calculated for each candidate vector. A penalty is determined for a subset of candidate vectors on the basis of the values of the pixels of the pixel block in the preceding original image from which the candidate motion vector points to the current block and/or on the basis of the values of the pixels of the pixel block in the following original image to which the candidate motion vector points from the current block.

20 Claims, 3 Drawing Sheets

(56) References Cited

U.S. PATENT DOCUMENTS

| | | | |
|---|---|---|---|
| 5,212,548 A | 5/1993 | de Haan et al. | 348/416.1 |
| 5,959,672 A | 9/1999 | Sasaki | 375/240.23 |
| 6,128,047 A | 10/2000 | Chang et al. | 348/699 |
| 6,285,795 B1 | 9/2001 | Cho | 382/243 |
| 6,430,316 B1 | 8/2002 | Wilkinson | 382/236 |
| 2005/0013496 A1 | 1/2005 | Bruls et al. | 382/239 |

METHOD AND DEVICE FOR IMAGE INTERPOLATION SYSTEMS BASED ON MOTION ESTIMATION AND COMPENSATION

CROSS-REFERENCE TO RELATED APPLICATIONS

This application is a continuation of prior U.S. application Ser. No. 13/206,315, filed Aug. 9, 2011, now U.S. Pat. No. 8,630,338, which is a divisional of prior U.S. application Ser. No. 11/136,293, filed May 24, 2005, now U.S. Pat. No. 8,000, 386. The entire disclosures of U.S. application Ser. No. 13/206,315 and U.S. application Ser. No. 11/136,293 are herein incorporated by reference.

Additionally, this application is based upon and claims priority from prior French Patent Application No. 04 05634, filed May 25, 2004, the entire disclosure of which is herein incorporated by reference.

FIELD OF THE INVENTION

The present invention relates to the field of sequential image display, and more precisely to image processing methods for encoding images or inserting images within a sequence of images of the video or film type.

BACKGROUND OF THE INVENTION

In certain video or film image processing systems, the image rate (number of images per second) is insufficient for high-quality display. Consequently, additional images are generated via an interpolation function and displayed between original images in order to increase the image rate and improve the quality of the display. An interpolation function of this type conventionally calculates the value of the pixels of an interpolated image, in particular as a function of the value of the pixels of the preceding original image and/or the value of the pixels of the following original image.

Such an interpolation function is based on the correlation that exists between successive images of a video or film. This is because, in a sequence of video images, subjects that are moving generally appear in different respective regions of several consecutive images. Interpolated images are therefore generated from parts of preceding and/or following original images.

Conventionally, an image is divided into pixel blocks and the assumption is made that each block is substantially identical from one image to another even if there is motion of this block between two images. Consequently, an image is interpolated from original images by seeking, for each current block of the image being interpolated, that one of the blocks of a preceding original image and/or a following original image that is the most probable.

Motion estimation and/or compensation methods offer block searching methods thus adapted for generating interpolated images. A correlation between those parts of the consecutive images in which a moving object appears may in fact be expressed via a motion vector. The motion vector represents the motion of a pixel block from one image to the other. It has a vertical component and a horizontal component, representing the displacement that has to be applied to a block of a preceding image in order to arrive at the position of a substantially identical pixel block in a following image.

Such methods are conventionally used in video data compression systems, such as systems based on the MPEG standard. Such systems are used to reduce the quantity of image data to be transmitted or stored, by compressing this data so as to allow it to be rapidly transferred to digital networks or even telephone lines, or to allow it to be recorded on digital media. Consequently, only certain reference images are encoded and transmitted, and then, on the receive side, the missing intermediate images are interpolated according to the motion vectors transmitted with the encoded images.

In such systems, on the transmit side, the intermediate image is processed so as to transmit the least possible amount of information, as mentioned above. Thus, the intermediate image is divided into blocks. For each block, a correlation is calculated between the current block and a selection of candidate blocks of a preceding and/or following original or already processed image. This correlation calculation delivers an error relating to each candidate block. A candidate block is elected, in order to represent the current block of the intermediate image. The elected candidate block is that one having the highest correlation with the current block, or else the smallest error. To allow interpolation of the intermediate images on the receive side, the processed image is transmitted via the following information, which is generally transmitted relative to a current block of an image to be interpolated:
   an indication of the candidate block elected;
   a motion vector representing a displacement of the elected candidate block to the position of the current block; and
   an error delivered by the correlation calculation.

Thus, on the receive side, the missing processed images are interpolated on the basis of the information received with the encoded images and a value of pixels of each block of these images is thus determined.

Certain interlaced image display systems also use motion estimation and/or compensation methods.

Image rate conversion devices also employ such methods. Such devices make it possible in fact to increase an original image rate by generating additional images obtained by interpolation of the original images. These devices are conventionally used to adapt the image rates between, on the one hand, an image generation, encoding, transmission and/or storage system and, on the other hand, an image display system, which involve different image rates.

In this case, the image to be interpolated is divided into blocks. For each of the blocks, candidate vectors are generally generated. For each of the candidate vectors, a block in the preceding original image and a block in the following original image corresponding to a displacement of the position of the current block relative to the candidate vector are selected, and then the correlation between the selected block of the preceding image and the selected block of the following image is calculated. The candidate vector elected is the vector for which the calculated correlation is the largest. The current block is then interpolated from the block in the preceding original image and from the block in the following original image that are associated with the candidate vector elected. In this way, images are generated by interpolation.

The term "processed image" refers to images divided into a plurality of blocks for which a motion vector has been elected. Thus, interpolated images are generated by interpolation of the processed images.

The next section presents basic concepts conventionally used in motion estimation methods. It is common practice to distinguish several types of images: original images of type I (intra images) which are encoded without reference to other images; images of type P (predictive images) which are interpolated via a motion estimation algorithm on the basis of a preceding original image; and images of type B (bidirectional images) which are interpolated via a motion estimation algorithm based on a preceding original image and on a following original image.

In general, a motion estimation is based on the assumption that a block of pixels of the image being processed can be modeled as a displacement of a block of the preceding and/or following original image. In such a model, it is therefore assumed that each pixel of any one block of pixels undergoes substantially the same displacement. A motion vector associated with each block of pixels of a processed image represents this displacement movement. Then, by applying to each of the pixel blocks of the preceding original image and/or each of the pixel blocks of the following original image a displacement corresponding to the respective associated motion vector, each current block of the image being processed is generated from a pixel block of the preceding and/or following original image in order to obtain an interpolated image.

In motion estimation methods, the motion vector associated with the current block of pixels is elected from among a set of candidate motion vectors. In conventional methods, an error is calculated for each of the candidate motion vectors and the elected motion vector is that one among the candidate motion vectors that has the smallest calculated error, that is to say the highest correlation.

When, for a given current block, the calculated errors for at least two of the candidate motion vectors are substantially equivalent, it is difficult to elect the most suitable motion vector for this current block. However, the performance of such methods depends especially on the choice of the motion vector to be associated with the current block since the interpolated image is obtained from this information. In cases when it is difficult to elect a motion vector on the basis of the calculated error, certain methods are used to apply penalties to the calculated errors with respect to the candidate motion vectors.

Thus, motion estimation methods in which a penalty is applied to the calculated error for each candidate vector, so as to deliver a modulated error relative to the candidate vector, are known. The elected motion vector for a current block is that one, among the candidate motion vectors, that has the smallest error thus modulated.

International Application Publication No. WO 02/087210 discloses a method for calculating an error with a penalty, with the penalty depending on the position and the norm of the candidate motion vectors.

SUMMARY OF THE INVENTION

It is an object of the present invention to provide improved processes for calculating penalty-modulated errors. Thus, preferred embodiments of the present invention provide methods in which an adapted penalty is determined for a candidate vector on the basis of characteristics relative to the values of the pixels of the associated block corresponding to the candidate vector.

One embodiment of the present invention provides a motion estimation method for processing images intended to be inserted, between a preceding original image and a following original image, into a sequence of images. Each of the images is divided into a plurality of pixel blocks, and a motion vector is associated with each of the pixel blocks of a processed image. According to the method, for a current block of an image being processed, there are selected spatial motion vectors associated with pixel blocks of the image being processed and/or temporal motion vectors associated with determined pixel blocks of an already processed image. Candidate motion vectors are generated from the selected motion vectors, and an error is calculated for each of the candidate motion vectors. A penalty is determined for at least one subset of the candidate motion vectors, and a motion vector is elected from among the candidate motion vectors based on the error that is calculated and the penalty that is determined. Information associating the elected motion vector with the current pixel block is stored. The penalty is determined according to values of the pixels of that pixel block in the preceding original image from which the candidate motion vector points to the current block and/or according to values of the pixels of that pixel block in the following original image to which the candidate motion vector points from the current block.

Another embodiment of the present invention provides a motion estimation device for processing images intended to be inserted, between a preceding original image and a following original image, into a sequence of images. Each of the images is divided into a plurality of pixel blocks, and a motion vector is associated with each of the pixel blocks of a processed image. The device includes a selection unit, a generation unit, a calculation unit, a determination unit, an election unit, and a memory. The selection unit selects spatial motion vectors associated with pixel blocks of the image being processed and/or temporal motion vectors associated with pixel blocks of an already processed image. The generation unit generates candidate motion vectors from the selected motion vectors, and the calculation unit calculates an error for each of the candidate motion vectors. The determination unit determines a penalty for at least one subset of the candidate motion vectors, and the election unit elects a motion vector from among the candidate motion vectors based on the error that is calculated and the penalty that is determined. The memory stores information associating the elected motion vector with the current pixel block. The determination unit determines the penalty according to values of the pixels of that pixel block in the preceding original image from which the candidate motion vector points to the current block and/or according to values of the pixels of that pixel block in the following original image to which the candidate motion vector points from the current block.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

DETAILED DESCRIPTION OF PREFERRED EMBODIMENTS

Figure 1:
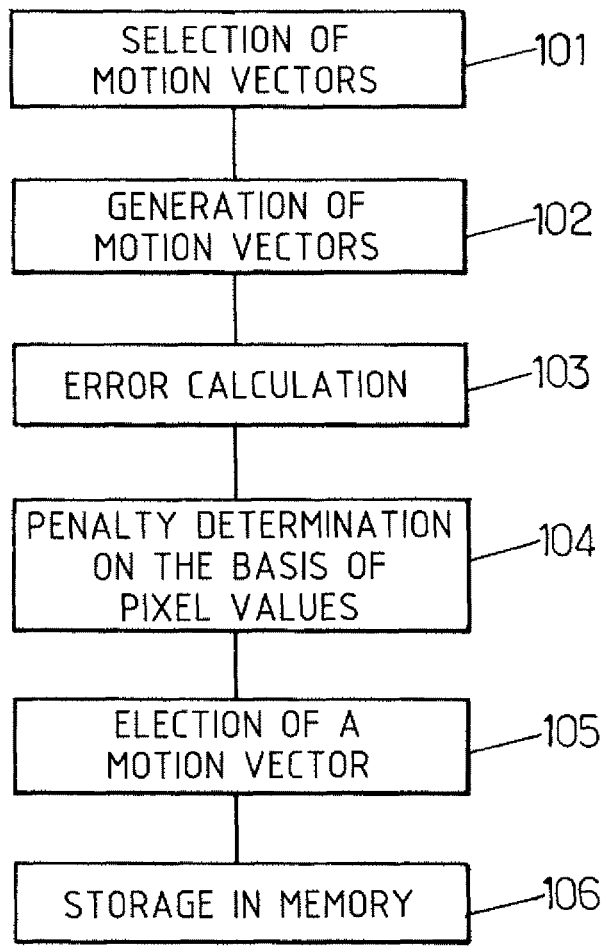
FIG. 1 is a flow chart illustrating steps of a method according to one embodiment of the present invention.

Preferred embodiments of the present invention will be described in detail hereinbelow with reference to the attached drawings.

Preferred embodiments of the present invention provide a motion estimation method for processing images that are each intended to be inserted between a preceding original image and a following original image in a sequence of determined images. Each image is divided into a plurality of pixel blocks, and a motion vector is associated with each of the pixel blocks of a processed image. According to the method, for a current block of an image being processed, the following steps are performed. There are selected spatial motion vectors associated with respective pixel blocks of the image being processed and/or temporal motion vectors associated with respective pixel blocks of a preceding processed image. Candidate motion vectors are generated from the selected motion vectors, and an error is calculated for each of the candidate motion vectors. A penalty is determined for at least one subset of the candidate motion vectors, and a motion vector is elected from among the candidate motion vectors on the basis of the calculated error and the penalty that is determined. Information associating the elected motion vector with the current pixel block is stored. The penalty is determined according to at least values of the pixels of that pixel block in the preceding original image from which the candidate motion vector points to the current block and/or according to at least values of the pixels of that pixel block in the following original image to which the candidate motion vector points from the current block.

In one embodiment of the present invention, for a candidate motion vector generated from a spatial motion vector, a first value is calculated that corresponds to the mean luminance of the pixels of that pixel block in the preceding original image from which the candidate motion vector points to the current block. Next, a second value is calculated that corresponds to the mean luminance of the pixels of that pixel block in the preceding original image from which the candidate motion vector points to the pixel block associated with the motion vector from which the candidate motion vector is generated. The penalty is then determined on the basis of a comparison between the first and second values in such a way that the penalty is relatively large when the first and second values are substantially different and is relatively small when the first and second values are substantially equivalent.

Preferably, for a candidate motion vector generated from a spatial motion vector, it is also possible to calculate a third value that corresponds to the mean luminance of the pixels of that pixel block in the following original image to which the candidate motion vector points from the current block. It is then possible to calculate a fourth value that corresponds to the mean luminance of the pixels of that pixel block in the following original image to which the candidate motion vector points from the pixel block associated with the motion vector from which the candidate motion vector is generated. Next, it is then possible to determine the penalty on the basis of a comparison between the third and fourth values in such a way that the penalty is relatively large when the third and fourth values are substantially different and is relatively small when the third and fourth values are substantially equivalent.

In some embodiments, for a candidate motion vector generated from a temporal motion vector, it is possible to calculate a fifth value that corresponds to the maximum contrast between pixels of that pixel block in the preceding original image from which the candidate vector points to the current pixel block. Next, the penalty is determined on the basis of the fifth value in such a way that the penalty is relatively large when the fifth value is relatively low and is relatively small when the fifth value is relatively high.

Preferably, for a candidate motion vector generated from a temporal motion vector, it is possible to calculate a sixth value that corresponds to the maximum contrast between pixels in that pixel block in the following original image to which the candidate vector points from the current pixel block. Next, the penalty is determined on the basis of the sixth value in such a way that the penalty is relatively large when the sixth value is relatively low and is relatively small when the sixth value is relatively high.

In one embodiment of the present invention, the subset of candidate motion vectors includes the candidate motion vector having the lowest error and a determined number of candidate motion vectors having errors that the difference between which and the lowest error is less than a determined threshold value.

Further embodiments of the present invention provide a motion estimation device for processing images that are each intended to be inserted between a preceding original image and a following original image in a sequence of determined images. Each image is divided into a plurality of pixel blocks, and a motion vector is associated with each of the pixel blocks of a processed image. The device includes, with respect to a current block of an image being processed, a selection unit for selecting motion vectors associated with the respective pixel blocks of the image being processed and/or motion vectors associated with respective pixel blocks of a preceding processed image (known as spatial motion vectors and temporal motion vectors, respectively). The device also includes a generation unit, a calculation unit, a determination unit, an election unit, and a memory. The generation unit generates candidate motion vectors from the selected motion vectors, and the calculation unit calculates an error for each of the candidate motion vectors. The determination unit determines a penalty for at least one subset of the candidate motion vectors, and the election unit elects a motion vector among the candidate motion vectors on the basis of the calculated error and of the penalty thus determined. The memory stores information associating the elected motion vector with the current pixel block. The penalty is determined according to at least values of the pixels of that pixel block in the preceding original image from which the candidate motion vector points to the current block and/or according to at least values of the pixels of that pixel block in the following original image to which the candidate motion vector points from the current block.

Still further embodiments of the present invention provide a computer program product that can be loaded directly into the internal memory of a digital computer. The computer program product includes software code portions for executing the steps of a method according to an embodiment of the present invention when the program is run on the computer.

Exemplary embodiments of the present invention will now be described in detail with reference to the figures.

In general, motion estimation methods include a step in which, for a given current block in an image being processed, a plurality of pixel blocks, in the preceding processed image or in the image being processed, is selected, with the pixel blocks being candidates for representing the current pixel block. For example, such a selection may be made by defining positions of the pixel blocks of the preceding processed image relative to the position of the current block. Thus, since each candidate pixel block is a block of the preceding processed image, a motion vector is associated therewith. Consequently, by selecting a plurality of pixel blocks in the preceding processed image in order to represent the current block, a plurality of motion vectors that are respectively associated therewith is also selected.

FIG. 1 illustrates steps carried out on each pixel block of an image being processed in a method according to one embodiment of the present invention. Motion vectors associated with blocks of an already processed image or already associated with blocks of an image being processed are selected in step

101. Next, a candidate motion vector is generated from each of these selected motion vectors in step 102. An error related to each candidate motion vector is calculated in step 103. Such an error calculation will be explained in detail below. Next, for a subset of the candidate motion vectors, a penalty value is determined on the basis of the value of the pixels of certain pixel blocks of the preceding original image and/or of the following original image in step 104. Next, the most suitable motion vector for the block being processed is elected from among the candidate motion vectors in step 105. Information associating the elected motion vector with the pixel block being processed is stored in memory in step 106.

A motion estimation method can select motion vectors from among the motion vectors already associated with pixel blocks, either in a preceding processed image or in the same image (known as temporal motion vectors and spatial motion vectors, respectively), according to very diverse criteria. The present invention also covers any other type of motion vector selection.

Whatever the type of motion vector selection for a current block, candidate vectors are conventionally generated from the selected motion vectors. The expression "generation of candidate vectors from motion vectors" makes reference to the fact that the candidate vectors may be different from the selected motion vectors. This is because the selected motion vectors may be suitable for generating candidate vectors allowing the performance of such image processing methods to be optimized.

Next, an election step is generally carried out in which the motion vector most suitable for the current block is elected from among the candidate vectors that are generated. To determine the most suitable of the candidate vectors, an error is calculated for each of the candidate motion vectors. This error is conventionally calculated by correlation, pixel by pixel, of certain pixel blocks. In image compression systems, a correlation between a pixel block in a following or preceding original image and the current pixel block is performed. Specifically, in such systems, since this step is carried out on the transmit side, the values of the pixels of the current block are used. In image rate conversion systems, since the values of the pixels of the current block being processed are not available, it is preferred to perform a correlation on pixel blocks of the following and/or preceding original image.

Figure 2:
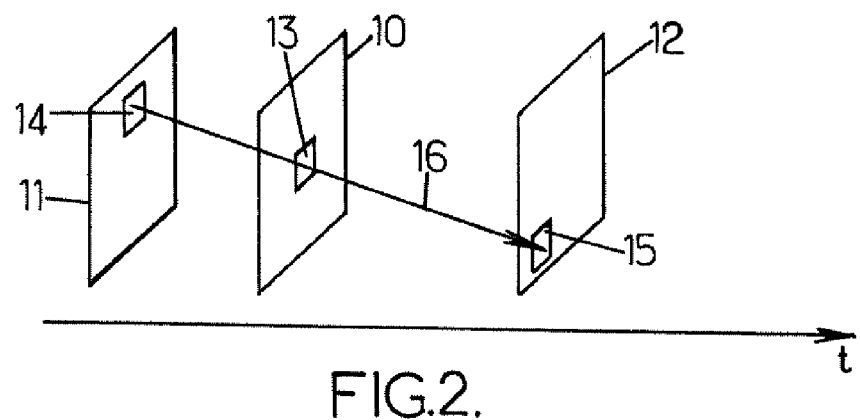
FIG. 2 illustrates a technique for calculating errors.

FIG. 2 illustrates an error calculation by pixel block correlation in an image rate conversion system. The image 10 being processed includes a current block 13. The image 10 being processed is processed according to a preceding original image 11 and a following original image 12. A correlation is performed between a first pixel block 14 in the preceding original image 11 and a second pixel block 15 in the following original image 12. The first pixel block 14 is that block of pixels from which the candidate vector 16 points to the current pixel block 13. The second pixel block 15 is that pixel block to which the candidate vector 16 points from the current pixel block 13. The difference in pixel values between the two blocks 14 and 15 is then calculated, pixel by pixel. An error is then obtained whose value is equal to the sum of the absolute values of these differences.

The present invention also covers any other method of calculating errors relating to a candidate vector for a current block.

In one embodiment of the present invention, the penalty to be applied to an error relating to a candidate vector generated from a spatial motion vector is preferably based on the principle indicated below. A motion vector already associated with a pixel block of a processed image or an image being processed is all the more representative of the movement of the set of pixels of the current block when the block with which it is associated belongs to the same object as the object to which the current block belongs. In fact, it appears more probable that various parts of one and the same object undergo the same movement throughout the images than parts of different objects.

Embodiments of the present invention apply this principle advantageously. For this purpose, in one embodiment of the present invention, a candidate vector generated from a motion vector associated with a pixel block belonging to the same object as the current pixel block is preferably elected for the current block. Conversely, a candidate vector generated from a motion vector associated with a pixel block belonging to an object different from that to which the current block belongs is preferably disfavored with regard to its election.

To determine whether two pixel blocks are blocks of the same object, in one embodiment of the present invention, a mean luminance comparison is made. Thus, two blocks having a substantially equivalent mean luminance are assumed to be two blocks belonging to the same object. In contrast, two blocks having substantially different mean luminances are assumed to be two blocks belonging to different objects.

Thus, in one embodiment of the present invention, to determine a penalty relating to a candidate vector generated from a spatial motion vector, the mean luminances of a first and a second pixel block in the preceding original image are calculated, the first pixel block corresponding to the pixel block from which the candidate vector points to the current pixel block and the second pixel block corresponding to the pixel block from which the candidate vector points to the pixel block with which the spatial motion vector, from which the candidate vector was generated, is associated. Such luminance calculations are preferably carried out for candidate vectors having substantially equivalent calculated errors, or at least those whose errors do not allow the most suitable of the candidate vectors to be elected with certainty.

When the luminances of the first and second pixel blocks thus obtained are substantially equivalent, a penalty of relatively low value is applied. Conversely, when the luminances are substantially different, a penalty of relatively high value is applied to this candidate vector.

Figure 3:
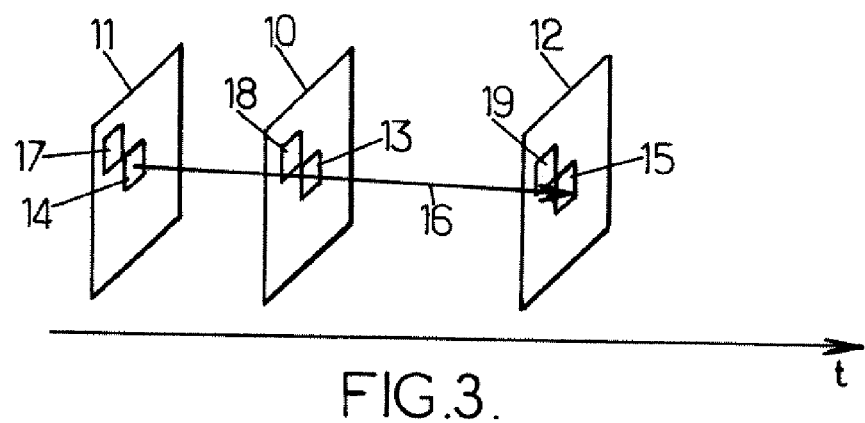
FIGS. 3, 4, 5 and 6 illustrate techniques for calculating penalties according to one embodiment of the present invention.

FIG. 3 illustrates a method for determining a penalty according to one embodiment of the present invention. For the current block 13 in the image 10 being processed, a candidate vector 16 is generated from a motion vector associated with a pixel block 18 neighboring the current block 13 and already processed in the image being processed. Thus, the mean luminance is calculated for the pixel block 14 from which the candidate vector 16 points to the current block 13. The mean luminance for the pixel block 17 from which the candidate vector 16 points to the neighboring pixel block 18 is calculated. If the two mean luminances are substantially equivalent, the penalty assigned to the candidate vector 16 is relatively small. However, if the two mean luminances are substantially different, the penalty assigned to the candidate vector 16 is relatively large.

Such a method for determining a penalty may also be carried out for blocks of the following original image. Thus, the mean luminance for the pixel block 15, to which the candidate vector 16 points from the current block 13, is calculated. The mean luminance for the pixel block 19 to which the candidate vector 16 points from the neighboring pixel block 18 is calculated. If the two mean luminances are substantially equivalent, the penalty assigned to the candidate vector 16 is relatively small. However, if the two mean luminances are substantially different, the penalty assigned to the candidate vector 16 is relatively large.

In the case of image compression systems, values of the pixel blocks of the image being processed are available, and thus the mean luminance may be calculated for the current block 13 and for the neighboring pixel block 18. By comparing the two mean luminances, a penalty may be determined in the same way as indicated above.

Figure 4:
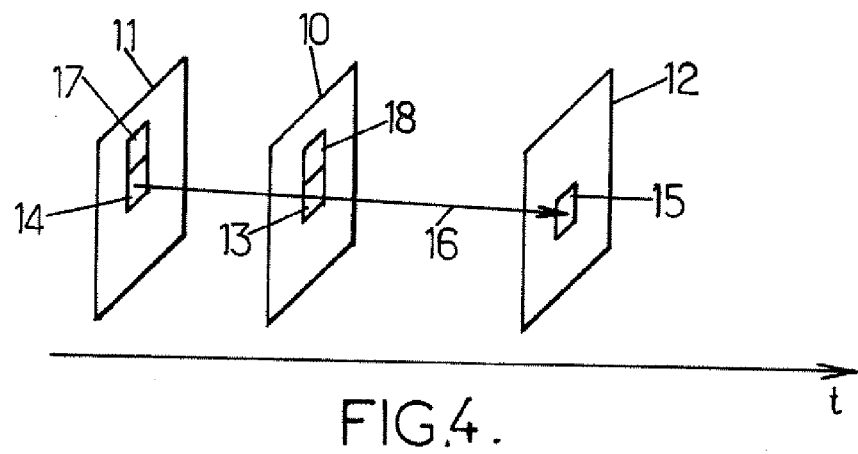
Figure 5:
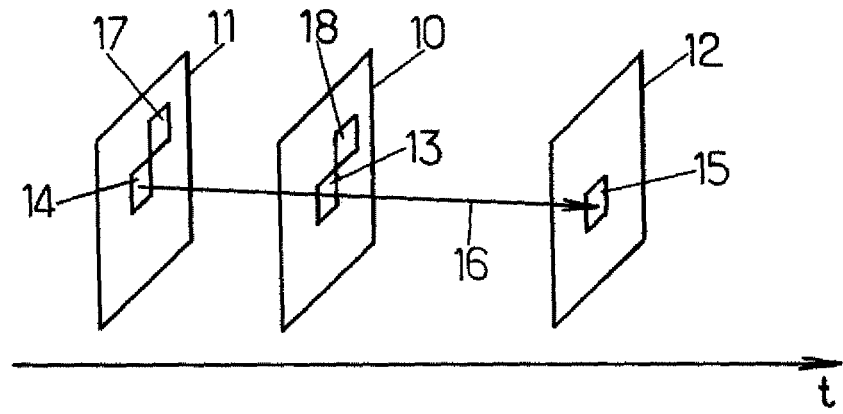
Figure 6:
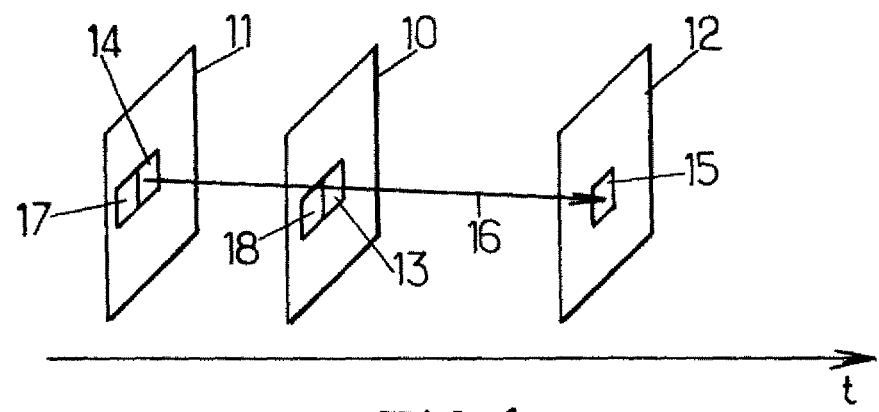

FIGS. 4, 5 and 6 illustrate the same method for determining a penalty.

In one embodiment of the present invention, the penalty to be applied to an error relating to a candidate vector generated from a temporal motion vector is based on the principle explained below.

In general, an error calculation is carried out by taking differences in the values of pixels, pixel by pixel, as already described above. The sum of the absolute values of the differences represents the error. Consequently, if the pixels of the pixel block being processed are relatively numerous to follow the movement represented by a candidate vector from or to an original image, then the value of the error obtained for this candidate vector is relatively low.

From the foregoing explanation, it will be understood that, for a pixel block having a low maximum contrast, that is to say a block wherein the pixels have substantially equivalent values, the value of the error relative to the same shift will be relatively low compared with the value of the error of a pixel block having a high contrast, that is to say a block wherein the pixels have very substantially different values. This is because the slightest shift of a block of contrasted pixels results in a large error, whereas the error calculated for a shift of a block of weakly contrasted pixels remains relatively low. Embodiments of the present invention aim to advantageously put this principle into practice.

Thus, in one embodiment of the present invention, for candidate vectors generated from temporal motion vectors, a penalty of relatively high value is determined for a candidate vector associated with a block of poorly contrasted pixels, whereas a relatively small penalty is determined for a motion vector associated with a block of highly contrasted pixels. Consequently, when the error is substantially equivalent, the election of candidate vectors generated from temporal motion vectors associated with blocks of more highly contrasted pixels will be favored. For this purpose, the difference between the lowest value of the pixels of the block and the highest value of the pixels of the block is calculated, in that pixel block of the preceding original image from which the candidate vector points to the current pixel block, in order to obtain a pixel block contrast value.

In a preferred embodiment of the present invention, for a given candidate vector, the penalty is added to the error. The maximum amplitude of the penalties is chosen so as to allow better election of a motion vector for a current block in the case in which the differences in the calculated errors for several candidate vectors are not very significant.

Preferably, such luminance and/or contrast calculations are carried out for the candidate vectors having the lowest and substantially equivalent calculated errors, or at least those candidate vectors whose errors do not allow the most suitable of the candidate vectors to be elected with certainty.

Thus, an error difference threshold value, below which it is considered that two or more candidate vectors are substantially equivalent with regard to the representation of the movement of the pixels of the block, is defined. In one embodiment, a penalty is determined only for the candidate vectors that have the lowest errors and from which the error differences are below the threshold value.

Good performance is achieved by simple implementation of an embodiment of the present invention.

The present invention makes it possible to improve the rendition of the image with regard to rapid movements and better performance uniformity in the sequence of images. Advantageously, it can be implemented in systems such as those defined above.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A motion estimation method for processing images intended to be inserted, between a preceding original image and a following original image, into a sequence of images, each of the images being divided into a plurality of pixel blocks, and a motion vector being associated with each of the pixel blocks of a processed image, the method comprising, for a current block of an image being processed, the steps of:

selecting spatial motion vectors associated with pixel blocks of the image being processed and/or temporal motion vectors associated with determined pixel blocks of an already processed image;

generating candidate motion vectors from the selected motion vectors;

calculating, by a processing device, an error for each of the candidate motion vectors;

determining a penalty for at least one subset of the candidate motion vectors;

electing a motion vector from among the candidate motion vectors based on the error that is calculated and the penalty that is determined; and storing information associating the elected motion vector with the current pixel block, wherein the determining step comprises, for each candidate motion vector of the subset:

calculating a first value corresponding to a value of the pixels of the pixel block in the preceding original image from which that candidate motion vector points to the current block;

calculating a second value corresponding to a value of the pixels of the pixel block in the preceding original image from which that candidate motion vector points to the pixel block with which the motion vector is associated, from which the candidate motion vector is generated, is associated; and comparing the first and second values to determine the penalty with a magnitude corresponding to a difference between the compared first and second values.

2. The method according to claim 1, wherein determining further comprises calculating the penalty based on the comparing of the first and second values in such a way that the penalty is relatively large when the first and second values are substantially different and is relatively small when the first and second values are substantially equivalent.

3. The method according to claim 1, wherein the determining step comprises, for a candidate motion vector generated from a temporal motion vector, the sub-steps of:
calculating a third value corresponding to another value between pixels of the pixel block in the preceding original image from which the candidate vector points to the current pixel block; and
determining the penalty based on the third value in such a way that the penalty is relatively large when the third value is relatively low and is relatively small when the third value is relatively high.

4. The method according to claim 3,
wherein the one value is one of a luminance value and a contrast value, and
the other value is the other of the luminance value and the contrast value.

5. The method according to claim 1, wherein the one value is one of a luminance value and a contrast value.

6. The method according to claim 1, wherein the determining step comprises, for a candidate motion vector generated from a spatial motion vector, the sub-steps of:
calculating a third value corresponding to one value of the pixels of the pixel block in the following original image to which the candidate motion vector points from the current block;
calculating a fourth value corresponding to the one value of the pixels of the pixel block in the following original image to which the candidate motion vector points from the pixel block with which the motion vector, from which the candidate motion vector is generated, is associated; and
determining the penalty based on a comparison between the third and fourth values in such a way that the penalty is relatively large when the third and fourth values are substantially different and is relatively small when the third and fourth values are substantially equivalent.

7. The method according to claim 1, wherein the subset of candidate motion vectors includes the candidate motion vector having the lowest error and a determined number of candidate motion vectors having errors such that the difference between each of the errors and the lowest error is less than a determined threshold value.

8. The method according to claim 1, wherein, for each candidate motion vector of the subset, the determining step comprises at least one of:
calculating a first value corresponding to one value of the pixels of one of the pixel blocks in the preceding original image; and
calculating a first value corresponding to the one value of the pixels of one of the pixel blocks in the following original image.

9. The method according to claim 1, wherein, for each candidate motion vector of the subset, the determining step comprises determining the penalty based on one value of the pixels of that pixel block in the preceding original image from which that candidate motion vector points to the current block and/or based on the one value of the pixels of that pixel block in the following original image to which that candidate motion vector points from the current block.

10. A motion estimation device for processing images intended to be inserted, between a preceding original image and a following original image, into a sequence of images, each of the images being divided into a plurality of pixel blocks, and a motion vector being associated with each of the pixel blocks of a processed image, the device comprising, with respect to a current block of an image being processed:
a selection unit for selecting spatial motion vectors associated with pixel blocks of the image being processed and/or temporal motion vectors associated with pixel blocks of an already processed image;
a generation unit for generating candidate motion vectors from the selected motion vectors;
a calculation unit for calculating an error for each of the candidate motion vectors;
a determination unit for determining a penalty for at least one subset of the candidate motion vectors; and
an election unit for electing a motion vector from among the candidate motion vectors based on the error that is calculated and the penalty that is determined; and
a memory for storing information associating the elected motion vector with the current pixel block;
wherein the determination unit comprises:
a first calculation unit for calculating a first value corresponding to one value of the pixels of the pixel block in the preceding original image from which the candidate motion vector points to the current block; and
a second calculation unit for calculating a second value corresponding to the one value of the pixels of the pixel block in the preceding original image from which the candidate motion vector points to the pixel block with which the motion vector, from which the candidate motion vector is generated, is associated;
said determination unit determines the penalty based on a comparison of the first and second values to have a magnitude corresponding to a difference between the compared first and second values.

11. The device according to claim 10, wherein the determination unit determines the penalty based on comparing the first and second values so that the penalty is relatively large when the first and second values are substantially different and is relatively small when the first and second values are substantially equivalent.

12. The device according to claim 11, further comprising, for a candidate motion vector generated from a spatial motion vector:
a third calculation unit for calculating a third value corresponding to the one value of the pixels of the pixel block in the following original image to which the candidate motion vector points from the current block; and
a fourth calculation unit for calculating a fourth value corresponding to the one value of the pixels of the pixel block in the following original image to which the candidate motion vector points from the pixel block with which the motion vector, from which the candidate motion vector is generated, is associated,
wherein the determination unit determines the penalty based on a comparison between the third and fourth values so that the penalty is relatively large when the third and fourth values are substantially different and is relatively small when the third and fourth values are substantially equivalent.

13. The device according to claim 12, furthermore comprising, for a candidate motion vector generated from a temporal motion vector:
a fifth calculation unit for calculating a fifth value corresponding to another value between pixels of the pixel block of the preceding original image from which the candidate vector points to the current pixel block,
wherein the determination unit determines the penalty based on the fifth value, so that the penalty is relatively large when the fifth value is relatively low and is relatively small when the fifth value is relatively high.

14. The device according to claim 10, wherein the subset of candidate motion vectors includes the candidate motion vector having the lowest error and a determined number of candidate motion vectors having errors, such that the difference between each of the errors and the lowest error is less than a determined threshold value.

15. A non-transitory computer readable medium encoded with a program for processing images intended to be inserted, between a preceding original image and a following original image, into a sequence of images, each of the images being divided into a plurality of pixel blocks, and a motion vector being associated with each of the pixel blocks of a processed image, the program including instructions for performing, for a current block of an image being processed, the steps of:
selecting spatial motion vectors associated with pixel blocks of the image being processed and/or temporal motion vectors associated with determined pixel blocks of an already processed image;
generating candidate motion vectors from the selected motion vectors;
calculating an error for each of the candidate motion vectors;
determining a penalty for at least one subset of the candidate motion vectors;
electing a motion vector from among the candidate motion vectors based on the error that is calculated and the penalty that is determined; and
storing information associating the elected motion vector with the current pixel block,
wherein determining comprises:
calculating a first value corresponding to one value of the pixels of the pixel block in the preceding original image from which the candidate motion vector points to the current block;
calculating a second value corresponding to the one value of the pixels of the pixel block in the preceding original image from which the candidate motion vector points to the pixel block with which the motion vector is associated, from which the candidate motion vector is generated; and
comparing the first and second values to determine the penalty with a magnitude corresponding to a difference between the compared first and second values.

16. The non-transitory computer readable medium according to claim 15, wherein determining comprises calculating the penalty based on the comparing of the first and second values in such a way that the penalty is relatively large when the first and second values are substantially different and is relatively small when the first and second values are substantially equivalent.

17. The non-transitory computer readable medium according to claim 15, wherein the subset of candidate motion vectors includes the candidate motion vector having the lowest error and a determined number of candidate motion vectors having errors such that the difference between each of the errors and the lowest error is less than a determined threshold value.

18. A motion estimation method for processing images intended to be inserted, between a preceding original image and a following original image, into a sequence of images, each of the images being divided into a plurality of pixel blocks, and a motion vector being associated with each of the pixel blocks of a processed image, the method comprising, for a current block of an image being processed, the steps of:
selecting spatial motion vectors associated with pixel blocks of the image being processed and/or temporal motion vectors associated with determined pixel blocks of an already processed image;
generating candidate motion vectors from the selected motion vectors;
calculating, by a processing device, an error for each of the candidate motion vectors;
determining a penalty for at least one subset of the candidate motion vectors;
electing a motion vector from among the candidate motion vectors based on the error that is calculated and the penalty that is determined; and
storing information associating the elected motion vector with the current pixel block,
wherein the determining step comprises, for each candidate motion vector of the subset:
calculating a first value corresponding to the one value of the pixels of the pixel block in the following original image to which the candidate motion vector points from the current block;
calculating a second value corresponding to the one value of the pixels of the pixel block in the following original image to which the candidate motion vector points from the pixel block with which the motion vector, from which the candidate motion vector is generated, is associated; and
comparing the first and second values to determine the penalty with a magnitude corresponding to a difference between the compared first and second values.

19. The method according to claim 18, wherein determining further comprises calculating the penalty based on the comparing of the third and fourth values in such a way that the penalty is relatively large when the first and second values are substantially different and is relatively small when the first and second values are substantially equivalent.

20. The method according to claim 19, wherein the determining step further comprises, for a candidate motion vector generated from a temporal motion vector, the sub-steps of:
calculating a third value corresponding to another value between pixels of the pixel block in the preceding original image from which the candidate vector points to the current pixel block; and
determining the penalty based on the third value in such a way that the penalty is relatively large when the third value is relatively low and is relatively small when the third value is relatively high.

* * * * *